(12) United States Patent
Balaz

(10) Patent No.: US 6,427,008 B1
(45) Date of Patent: Jul. 30, 2002

(54) METHODS AND DEVICES FOR BILLING TELECONFERENCES

(75) Inventor: Joseph V. Balaz, Burlington (CA)

(73) Assignee: Accutel Conferencing Systems, Inc., Ontario (CA)

( * ) Notice: Subject to any disclaimer, the term of this patent is extended or adjusted under 35 U.S.C. 154(b) by 0 days.

(21) Appl. No.: 09/628,907

(22) Filed: Jul. 31, 2000

(51) Int. Cl.[7] .......................... H04M 3/42; H04M 15/00
(52) U.S. Cl. ............................ 379/202.01; 379/114.1; 379/114.12
(58) Field of Search .................. 379/114.01, 114.03, 379/114.1, 114.12, 114.21, 114.22, 114.24, 115.01, 115.02, 121.01, 121.02, 121.06, 126, 127.01, 202.01, 203.01, 204.01, 205.01, 206.01, 207.01

(56) References Cited

U.S. PATENT DOCUMENTS

| 5,408,526 A | * | 4/1995 | McFarland et al. | 379/202 |
|---|---|---|---|---|
| 5,473,605 A | * | 12/1995 | Grube et al. | 379/202 |
| 5,583,925 A | * | 12/1996 | Bernstein | 379/202 |
| 5,631,904 A | * | 5/1997 | Fitser et al. | 379/202 |
| 5,692,034 A | * | 11/1997 | Richardson et al. | 379/88 |
| 5,812,652 A | * | 9/1998 | Jodoin et al. | 379/205 |
| 5,844,973 A | * | 12/1998 | Venkatraman et al. | 379/202 |
| 5,953,400 A | * | 9/1999 | Rosenthal et al. | 379/202 |

* cited by examiner

Primary Examiner—Curtis Kuntz
Assistant Examiner—Rexford Barnie
(74) Attorney, Agent, or Firm—McDonnell Boehnen Hulbert & Berghoff

(57) ABSTRACT

A method and devices for calculating a billing total for a teleconference between a plurality of participants is disclosed. Advantageously, the teleconference may be a telephone conference call. Each of the participants is associated with an identifier of that participant's origin, such as a portion of the participant's telephone caller identification information. At least one particular identifier is used to signify that charges for a caller's participation should be attributed at a lower rate to the total. For participants associated with an identifier other than a reduced rate identifier charges are attributed to the total at a rate greater than this lower rate. A conference call service provider may use the method and system to charge reduced rates for certain participants, allowing the service provider to compete with locally located teleconference systems, for which participants would not incur long distance toll charges.

18 Claims, 4 Drawing Sheets

| ORGANIZER INFO. 52 | CONFERENCE TIME 54 | NUMBER OF PARTICIPANTS 56 | DNIS OF CONFERENCE 58 | CONFERENCE CALL ACCESS CODE 60 | REDUCED RATE CLID ATTRIBUTES 62 | REGULAR RATE/UNIT TIME 64 | REDUCED RATE/UNIT TIME 66 | LINK TO TABLE 68 |

| CLID INFO PARTICIPANT 1 | START TIME | FINISH TIME | CHARGES PARTICIPANT 1 |
| --- | --- | --- | --- |
| CLID INFO PARTICIPANT 2 | START TIME | FINISH TIME | CHARGES PARTICIPANT 2 |
| ⋮ | | ⋮ | |
| CLID INFO PARTICIPANT n | START TIME | FINISH TIME | CHARGES PARTICIPANT n |

FIG. 3

METHODS AND DEVICES FOR BILLING TELECONFERENCES

FIELD OF THE INVENTION

This invention relates generally to teleconferencing, and more specifically to a method and system for billing and allocating charges for such teleconferences.

BACKGROUND OF THE INVENTION

Modern business experiences an ever-increasing need for allowing multiple parties to communicate by way of teleconference. As such, teleconferencing services that allow multiple parties to conference using, for example, the public switched telephone network ("PSTN") have become common place. Typically, telephone calls originated by conference participants are bridged at a centrally located conference bridge.

In the future similar teleconferences will likely be readily available using a packet switched data or other communications network. Such similar teleconferences may incorporate data, audio and video, allowing conference participants to hear and see each other, as well as exchange information.

The costs of such teleconferences must, of course, be borne by someone. At present, costs of teleconference calls are typically billed to a call organizer. Commercial conference call service providers, for example, usually charge conference call organizers based on the duration of a call and the number of call participants or anticipated participants. Of course, if call participants are not local to the conference bridge, long distance charges may apply for a participant's call to the bridge. These long distance charges are typically borne by individual participants.

Often, conference call organizers do not wish to discourage call participation. As such, efforts are made to minimize the inconvenience and expense to participants. As a result, conference calls are often offered by way of toll-free telephone lines. These lines are leased by the conference call service provider and associated costs are billed back to the conference call organizer.

Call organizers, in turn, make efforts to minimize toll charges. As such, conference call organizers make efforts to locate the conference call bridge in a location local to the majority of call participants. Conference call service providers, as a consequence, often locate bridges in multiple large communities or lease telephone trunks local to such communities, thereby allowing the maximum number of callers to participate without incurring toll charges. This, of course, increases a conference call service provider's overhead.

Accordingly, improved methods and associated devices for allocating conference call charges are desirable.

SUMMARY OF THE INVENTION

It is therefore an object of the present invention to allow a conference call service provider to charge a reduced rate for certain participants, allowing such service providers to compete with locally located conference bridges.

In accordance with an aspect of the present invention there is provided a method of calculating a billing total for a teleconference between a plurality of participants. Each of the participants originates participation in the teleconference. Each of the participants is associated with an identifier of origin identifying that participant's origin. The method includes, in response to a teleconference organizer reserving teleconference resources for the teleconference, associating a selected reduced rate identifier of a specified origin of participants for whom reduced charges for participation in the teleconference are to be attribute d and storing the reduced rate identifier for the teleconference. For each of the participants whose identifier of origin corresponds to the reduced rate identifier, charges for participation in the teleconference are attributed to the total at a first rate. For each of the participants whose identifier of origin does not correspond to the reduced rate identifier, charges for participation in the teleconference are attributed to the total at a rate greater than the first rate.

In accordance with another aspect of the present invention, there is provided a conference call center including a conference bridge for bridging a plurality of conference participants in a teleconference and a computing device in communication with the bridge to receive information about a conference, including an indicator of a duration of each of the call participant's participation in the call. The device is operable to calculate a charge total for the teleconference, by attributing charges to the total at a first rate, for each of the participants associated with a reduced rate identifier; attribute charges to the total at a rate greater than the first rate, for each of the participants associated with an identifier other than a reduced rate identifier.

In accordance with another aspect of the present invention, there is provided a billing device for calculating a charge total for a telephone conference, in communication with a conference bridge for bridging a plurality of conference participants in a teleconference, including an indicator of a duration of each of the call participant's participation in the call. The device is operable to calculate a charge total for the teleconference, by attributing charges to the total at a first rate, for each of the participants associated with a reduced rate identifier; and attribute charges to the total at a rate greater than the first rate, for each of the participants associated with an identifier other than a reduced rate identifier.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In figures which illustrate, by example only, embodiments of the invention:

FIG. 2 illustrates an exemplary conference setup record stored in a database associated with the system of FIG. 1;

FIG. 3 illustrates an exemplary conference database table stored within the database associated with the system of FIG. 1.

DETAILED DESCRIPTION

Figure 1:
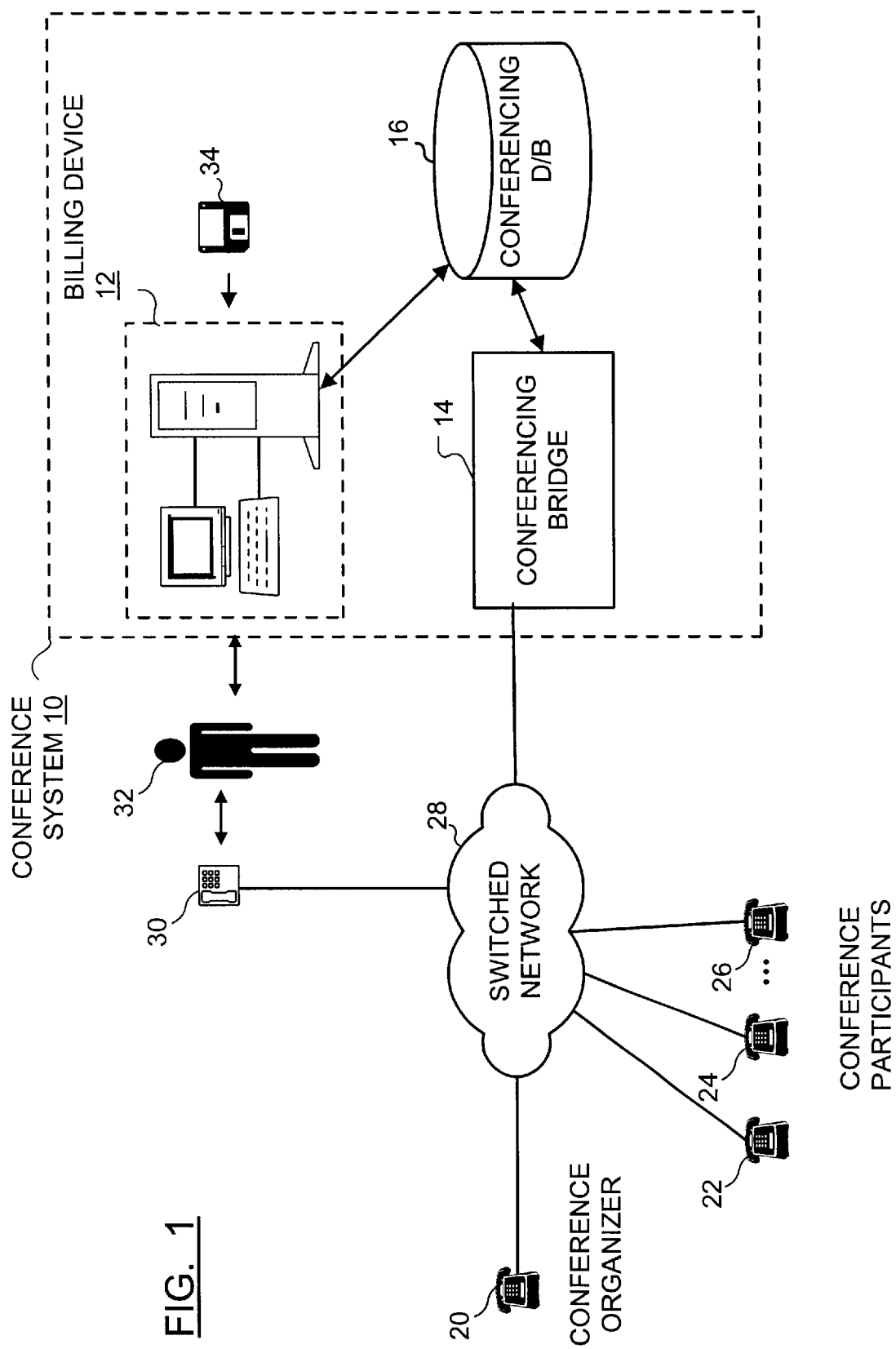
FIG. 1 illustrates a teleconference system exemplary of an embodiment of the present invention interconnected with a switched network and various exemplary users.

FIG. 1 illustrates a teleconference system 10, exemplary of an embodiment of the present invention. Exemplary teleconferencing system 10 is used for the establishment of telephone conference calls. However, it will be appreciated that many aspects and features of the present invention may be embodied and used in a variety of other teleconference systems, such as video conference systems, and the like.

Exemplary teleconference system 10 includes an exemplary billing computing device 12 and a conferencing bridge 14, each of which may communicate with a conferencing database 16. Various exemplary system users including a conference organizer at station 20 and conference participants 22, 24, and 26 are also illustrated. Each of a conference organizer at station 20 and conference participants 22, 24, and 26 is connected to a communications network 28, which is preferably the PSTN or any comparable communications network, such as a conventional packet or circuit switched network.

A receiver 30 proximate a human operator 32 is also in communication with switched network 28. Human operator 32 preferably collects and enters information used to establish a teleconference.

Switched network 28 is capable of providing Dialed Number Identification Service ("DNIS"), and the calling number identification ("CLID") service. As understood by those skilled in the art, DNIS capability allows the dialed number of multiple telephone numbers associated with the same physical destination to be identified and transmitted to the called party. DNIS capability is thus suitable for centrally processing calls to multiple destination telephone numbers at a single location, each of which requires different handling. The CLID service, on the other hand, provides a called party information about the identity of the calling party. Specifically, by way of the CLID service a call recipient may be provided with the calling party's number (in the form of automatic number identification ANI) and optionally the calling party's name.

Exemplary conferencing bridge 14 is an audio bridge used to interconnect the conference call between exemplary conference participants such as participants 22, 24 and 26. Conferencing bridge 14 is capable of automatically accepting telephone calls from conference participants by way of network 28 and connecting them to the appropriate one of multiple conferences simultaneously maintainable by the bridge 14. A suitable audio bridge that may easily be adapted to function in manners exemplary of the present invention is a available from Compunetix, Inc. of Monroeville, Pa. under model number Contex 480. Exemplary of the present invention, conferencing bridge 14 has two functions. First, bridge 14 is responsible for identifying the proper conference to which each incoming call should be connected and connecting or bridging the caller accordingly. Bridge 14 may use DNIS information received from the switched network 28, as well as an access or similar codes optionally received from conference participants 22, 24 and/or 26, by way of, for example, DTMF tones, to identify the proper conference with which would-be participants should be connect ed. Using this information, bridge 14 connects the participants. Second, bridge 14 may collect call information about each participant call that is connected with an established conference.

Conferencing database 16 is an exemplary database containing various types of information used by teleconference system 10. In particular, two categories of information, determined at various stages of the conference call process, are preferably stored in the database 16:

(1) conference set-up information, such as a unique conference identifier, telephone number, start time, total expected participant and other information, as may be determined during conference set-up; and (2) conference call details, i.e. metrics associated with the actual conference, as compiled by the conferencing bridge 14 during the course of the teleconference.

Conferencing database 16 may be any suitable database known to a person of ordinary skill in the art. Conferencing database 16 may be a commercially available relational or object-oriented database accessible by known database engines such as Dbase, SQL, or Fox Pro, or any other comparable commercial or proprietary database capable of storing conferencing information as described.

A billing computing device 12 is in communication with database 16. Billing computing device 12 may be a general purpose computing device, having a suitable processor and computer readable memory storing application software. Database 16 may be stored at device 12, at a dedicated computing device, or elsewhere. Device 12 preferably stores database engine software, that, when executing, is capable of reading, writing and updating database 16. As well, device 16 preferably stores and executes a suitable operating system, as well as report generating software useful to access database 16 and form billing reports in manners exemplary of the present invention. Software exemplary of the present invention may be loaded into this memory, from computer readable medium 34 in a conventional manner.

Database 16 further stores one or more conference setup records, associated with a particular teleconference. An example conference setup record 50 is illustrated in FIG. 2. In the exemplary embodiment, a conference setup record 50 is associated with each teleconference, in response to a conference call organizer reserving call resources. As illustrated, each conference setup record preferably includes a field 52 identifying a conference organizer, by name address and suitable billing information. Additionally, a field 54 contains the start time of the conference; a field 56 contains the maximum anticipated number of conference participants; a DNIS of the conference in field 58; an optional conference call access code in field 60; and a prefix identifier in field 62 used to identify the origination of calls for which reduced charges are to be passed to the call organizer. The identifier in field 62 may, for example identify an area code or area code for calls for which a reduced rate should be charged (ie. the digits XXX for ANI XXX-YYY-ZZZZ). Alternatively numbers representative of an exchange could be used to identify calls for which a reduced rate should be charged (eg. digits XXX-YY for ANI XXX-YYY-ZZZZ). Alternatively, the identifier in field 62 may contain an area code and multiple call origination prefixes. Similarly, the identifier in field 62 could contain multiple area codes, or any combination of area codes and call origination prefixes. Many other suitable identifiers will be readily recognized by those of ordinary skill. As will become apparent, the DNIS associated with the arranged conference call is preferably a toll free number, such as a "1-800" or "1-888" number. Additional regular and reduced, per unit time, call participation rates may be stored in fields 62 and 64 of a call setup record 50 within database 16. Finally, a link 66 identifies a table within database 16 used to store information relevant to a particular call.

Bridge 14, in turn further stores one or more conference summary tables, each of which is associated with a conference call and a setup record 50 as, for example, identified by field 66. An example table 70 is illustrated in FIG. 3. As illustrated, each table 70 stores a plurality of records 72a, 72b, etc. (collectively and individually record 72), each record 72 identifying a conference participant by a CLID of the conference call participant in field 74; conference participation start time for the participant in field 76; finish time in field 78; and charges associated with that participant's call participation in field 80. As will become apparent, fields 74, 76 and 78 of table 70 are populated using data collected by conference bridge 14 during a call. These fields may be populated during or shortly after completion of a conference. Billing field 80 of each record may be populated by device 12 at the completion of a conference.

In operation, then, a conference call organizer such as an organizer at station 20 as illustrated in FIG. 1 may contact a conference call service provider and provides sufficient information allowing the conference provider to populate a conference record 50 (FIG. 2). Specifically, the conference call organizer provides the name, and address, conference call time, and anticipated or maximum number of participants. These pieces of information may be provided verbally to an operator 32 who may create and populate a conference setup record 50 through use of an appropriate input peripheral at device 12. In response, the operator 32 provides the organizer with a telephone number that may be used to establish the conference at the scheduled time and possibly a call access code. As noted, the conference number is preferably a toll free number.

After this information is provided, a suitable number of telephone lines to bridge 14 for the scheduled conference call are reserved by the operator of system 10. As well, bridge 14 is configured to receive calls to the provided number at the established time. Bridge 80 may, for example, be in communication with database 16 and be automatically configured to bridge calls at the established time using data within database 16. Alternatively, suitable conference call data may be entered at bridge 14 manually or by way of an interconnected computer terminal or network (not illustrated).

The call organizer, in turn, provides this number, call time and optional access code to call participants such as participants 22, 24 and 26 in a conventional manner.

At the designated conference time, conference participants such as participants 22, 24, and 26 call the provided number and are connected with bridge 14. Callers are then bridged so that they may participate in the conference by bridge 14. As will be appreciated, bridge 14 bridges the conference participants using the DNIS assigned to a conference and/or the provided access code in a conventional manner. Thus, bridge 14 may bridge multiple calls at the same time. As each call from a participant is received, bridge 14 logs the start time and CLID information (if available) associated with the call provided by network 28. Bridge 14 thus logs the telephone number of each originating call and optionally the name of the participant caller, if provided by network 28. Of course, if no CLID information is provided, only the start and stop time of the call is logged.

At the conclusion of the conference then, the information about the conference may be transferred to database 16, and in particular to table 70 associated with the conference. Specifically, fields 74, 76, and 78 may be populated with CLID, start time, and finish time for each participant. As noted, bridge 14 may be in communication with database 16 in a conventional manner. As will be appreciated bridge 14 could transfer data to database 16 by way of device 12, or in any other known way during or after completion of the conference. After the relevant fields of table 70 are populated, billing device 12 may generate a billing report from the data collected in table 70.

Figure 4:
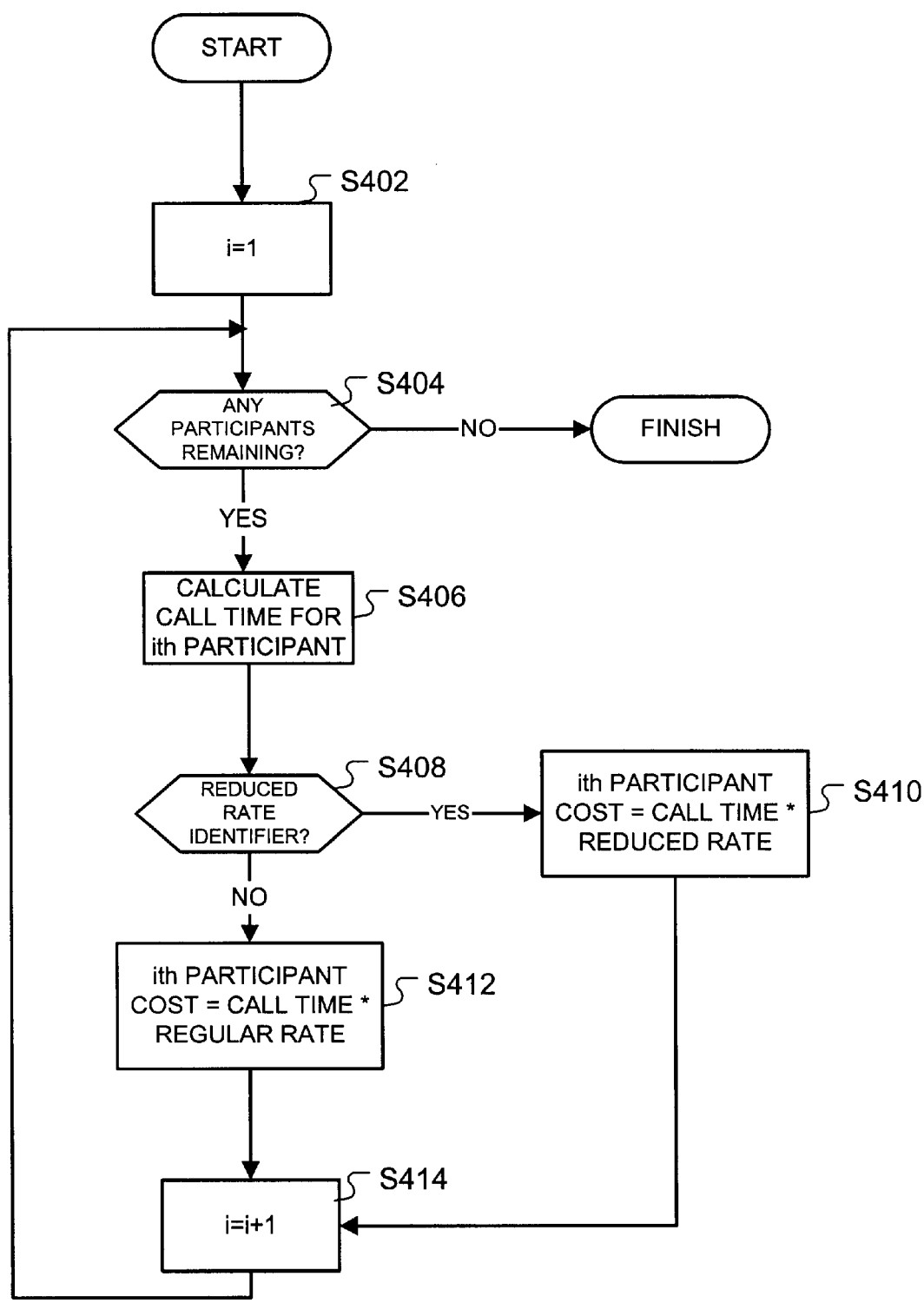
FIG. 4 illustrates exemplary steps to calculate charges for a conference established by the system of FIG. 1.

Exemplary steps S400 performed by billing device 12 in calculating conference charges for generating a billing report are illustrated in FIG. 4. An example counter i takes a value of 1 in step S402. Assuming at least one participant in the conference as determined in step S404, the charges for that participant in the conference are calculated in steps S406–S412. Specifically, the duration of the participant's attendance at the conference is calculated in step S406, by subtracting the call participants start and end time for the call as stored in fields 76 and 78 of an associated participant record 80. Next, the logged CLID stored in field 74 is compared to the identifier(s) stored in field to determine whether charges for the participant should be attributed at a regular rate or at a reduced rate, by comparing the CLID (or a portion of it) with the contents of field 62 (FIG. 2) for the call. In the event the CLID for the participant call indicates a call that has originated from the reduced rate origin, the participant call cost is attributed by multiplying the call duration by the per time unit charge stored in reduced rate field 62. The result is preferably logged in field 80 of an associated record 72 of table 70. In the event that the participant call does not have a CLID prefix signifying the reduced rate origin, the participant charge for the participant call is attributed at a regular rate by multiplying the call duration by the regular rate charge in field 64 of record 50. Again, the result is preferably logged in field 80 of the associated record 72. Next counter i is increment in step S414, and steps S404 onward are repeated for all call participants. As will be appreciated, in the event no CLID information is available, the associated participant charges are calculated at the regular rate.

Once all call participant charges are tallied for all conference participants, the call organizer may be provided with a suitable bill including ample billing details. Total conference charges may be calculating by summing conference charges attributable to each conference participant.

As should now be appreciated, system 10 allows a conference service that operates system 10 to bill charges for a conference in order to be competitive with a locally located conference bridge. Specifically, a toll free number may be assigned and provided to a conference organizer for use by participant to a particular conference call. Charges for participants for a particular specified area code may be reduce to nil, while charges for participant calls from other area codes may be attributed at a regular rate. Costs associated with the toll free number are absorbed and allocated by an operator of system 10.

As will readily be appreciated by a person of ordinary skill, the above embodiments are susceptible to numerous modifications. For example, billing device 12 and/or database 16 may be external to system 10, and communicate with system 10 by way of a data network, such as a local area network, or the like. Conference call reservations may for example be taken by way of a data network or interactive voice response unit. System 10 may further be adapted to allow conference pre-registration as for example, detailed in US patent application Ser. No. 09/578,052, filed May 24, 2000 and naming the inventor hereof as applicant. The contents of this patent application are hereby incorporated by reference herein.

As will also be appreciated, while the organization of software and hardware used in system 10, has been illustrated as clearly delineated, a person skilled in the art will appreciate that the delineation between such components is somewhat arbitrary. Numerous other arrangements of software and hardware components are possible.

The above described embodiments are intended to be illustrative only, and in no way limiting. The embodiments are susceptible to many modifications of form, size, arrangement of parts and details and order of operation. The invention, rather, is intended to encompass all such modifications within its scope as defined by the claims.

What is claimed is:

1. A method of calculating a billing total for a teleconfererce between a plurality of participants, each of said participants originating participation in said teleconference; each of said participants associated with an identifier of origin identifying that participant's origin, comprising:

in response to a teleconference organizer reserving teleconference resources for said teleconference, associating a selected reduced rate identifier of a specified origin of participants for whom reduced charges for participation in said teleconference are to be attributed;

storing said reduced rate identifier for said teleconference;

for each of said participants whose identifier of origin corresponds to said reduced rate identifier, attributing charges for participation in said teleconference to said total at a first rate;

for each of said participants whose identifier of origin does not correspond to said reduced rate identifier, attributing charges for participation in said teleconference to said total at a rate greater than said first rate.

2. The method of claim 1, wherein said teleconference comprises a telephone conference call.

3. The method of claim 1, wherein said identifiers of origin comprise caller identification (CLID) information.

4. The method of claim 2, where said reduced rate identifier identifies telephone calls originating in a particular area code.

5. The method of claim 2, wherein said reduced rate identifier identifies calls originating with a particular exchange.

6. The method of claim 4, wherein each of said participants participate in said teleconference by way of a toll free call.

7. The method of claim 2, wherein said charges attributed for each of said participants whose identifier of origin corresponds to said reduced rate identifier and said charges attributed for each of said participants whose identifier of origin does not correspond to said reduced rate identifier, are attributed based on a length of time each of said participants has participated in said teleconference.

8. The method of claim 1, wherein said first rate is nil, so that no toll costs are attributed to participants whose identifier of origin corresponds to said reduced rate identifier.

9. A computer readable medium, storing computer executable instruction adapting a computing device to operate in accordance with the method of claim 1.

10. A conference call center comprising:

a conference bridge for bridging a plurality of conference participants in a teleconference;

a computing device in communication with said bridge to receive information about a teleconference, including an indicator of a duration of each of said participant's participation in said teleconference, and an indicator of origin for each of said participants, said device operable to:

in response to a teleconference organizer reserving teleconference resources for said teleconference, store a reduced rate identifier for said teleconference, said reduced rate identifier associated with said teleconference and identifying a specified origin of participants for whom reduced charges for participation in said teleconference are to be attributed;

calculate a charge total for said teleconference, by attributing charges to said total at a first rate, for each of said participants whose indicator of origin corresponds with said reduced rate identifier;

attributing charges to said total at a rate greater than said first rate, for each of said participants whose indicator of origin does not correspond with said reduced rate identifier.

11. The center of claim 10, wherein said teleconference comprises a telephone conference call.

12. The center of claim 11, wherein said identifiers associated with said participants comprise caller identification (CLID) information.

13. The center of claim 11, wherein said reduced rate identifier identifies telephone calls originating in a particular area code.

14. The center of claim 11, wherein said reduced rate identifier identifies calls originating with a particular exchange.

15. The center of claim 11, wherein said device attributes charges for each of said participants associated with said reduced rate identifier and for each of said participants not associated said reduced rate identifier, based on a length of time each of said participants has participated in said conference.

16. The center of claim 10, wherein said first rate is nil, so that no toll costs are attributed to participants associated with said reduced rate identified.

17. A billing device for calculating a charge total for a telephone conference, in communication with a conference bridge for bridging a plurality of conference participants in a teleconference, including an indicator of a duration of each of said call participant's participation in said teleconference, and an indicator of origin for each of said participants, said device operable to:

in response to a teleconference organizer reserving teleconference resources for said teleconference, store a reduced rate identifier for said teleconference, said reduced rate identifier associated with said teleconference and identifying a specified origin of participants for whom reduced charges for participation in said teleconference are to be attributed;

calculate a charge total for said teleconference, by attributing charges to said total at a first rate, for each of said participants whose indicator of origin corresponds with said reduced rate identifier;

attributing charges to said total at a rate greater than said first rate, for each of said participants whose indicator of origin does not correspond with said reduced rate identifier.

18. A method of determining a total of billing charges for a teleconference to be billed to a teleconference organizer by a teleconference service provider, wherein facilities for said teleconference are provided by said teleconference service provider and reserved by said teleconference organizer, and wherein said teleconference is between a plurality of participants each originating participation in said teleconference, said method comprising:

associating with said teleconference a reduced rate identifier identifying a specified origin of participants for whom reduced charges for participational in said teleconference are to be attributed by said teleconference service provider, in response to said teleconference organize reserving said teleconference facilities with said teleconference service provider;

storing said reduced rate identifier;

receiving from a participant an identifier of origin for that participant as that participant participates in said teleconference;

if said identifier of origin corresponds to said reduced rate identifier, attributing to said total, at a reduced rate, charges for participation in said teleconference by said participant.

* * * * *